US010114366B2

United States Patent
Satake et al.

(10) Patent No.: US 10,114,366 B2
(45) Date of Patent: Oct. 30, 2018

(54) NUMERICAL CONTROLLER FOR MANAGING MACHINING DATA AND MACHINING RESULT

(71) Applicant: FANUC Corporation, Minamitsuru-gun, Yamanashi (JP)

(72) Inventors: Yoshikazu Satake, Minamitsuru-gun (JP); Hideaki Maeda, Minamitsuru-gun (JP); Kazuo Sato, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 291 days.

(21) Appl. No.: 15/148,269

(22) Filed: May 6, 2016

(65) Prior Publication Data
US 2016/0349739 A1    Dec. 1, 2016

(30) Foreign Application Priority Data

May 26, 2015    (JP) ................................ 2015-106777

(51) Int. Cl.
  *G05B 19/4155*    (2006.01)
(52) U.S. Cl.
  CPC ............... *G05B 19/4155* (2013.01); *G05B 2219/32128* (2013.01)
(58) Field of Classification Search
  CPC .................. G05B 19/4155; G05B 2219/32128
  See application file for complete search history.

(56) References Cited

U.S. PATENT DOCUMENTS

| | | | | |
|---|---|---|---|---|
| 5,806,078 A | * | 9/1998 | Hug ..................... | G06F 17/2288 707/999.202 |
| 2013/0076287 A1 | * | 3/2013 | Iwashita ............ | G05B 19/4068 318/561 |
| 2017/0038764 A1 | * | 2/2017 | Ito ...................... | G05B 19/4063 |

FOREIGN PATENT DOCUMENTS

| | | |
|---|---|---|
| JP | H01-210248 A | 8/1989 |
| JP | H03-294906 A | 12/1991 |
| JP | H05-143136 A | 6/1993 |
| JP | H07-311612 A | 11/1995 |
| JP | H08-63216 A | 3/1996 |
| JP | H10-320463 A | 12/1998 |
| JP | 2002-132311 A | 5/2002 |
| JP | 2007-226446 A | 9/2007 |
| JP | 2009-187206 A | 8/2009 |
| JP | 2013-069231 A | 4/2013 |

OTHER PUBLICATIONS

Notification of Reasons for Refusal dated Jun. 20, 2017 in Japanese Patent Application No. 2015-106777 (4 pages) with an English translation (3 pages).

* cited by examiner

*Primary Examiner* — Yuhui R Pan
(74) *Attorney, Agent, or Firm* — Drinker Biddle & Reath LLP

(57) ABSTRACT

A numerical controller stores, as project data, input data including at least a machining program and a machining condition and output data indicative of the result of operation control of a machine based on the input data. Further, version management of the project data is performed by a data management unit. With respect to a plurality of versions, the data management unit displays, in response to an operator's request, the relationship between the content of modification of the input data between the plurality of versions of the project data and a change of the output data.

6 Claims, 6 Drawing Sheets

| | PROJECT A Ver1 | PROJECT A Ver2 | PROJECT A Ver3 |
|---|---|---|---|
| TIME | MACHINING PROGRAM | MACHINING PROGRAM | MACHINING PROGRAM |
| 1[s] | N10 F2000 | N10 F2000 | N10 F2000 |
| | N20 G90 G00 X35 | N20 G90 G00 X35 | N20 G90 G00 X35 |
| | | N30 G01 X10 | N30 G01 X10 |
| | | N40 X2 0 | N40 X2 0 |
| 5[s] | N30 G01 X10 | | N50 Y30 |
| | | | : |
| | N40 X2 0 | N50 Y40 | |
| | N50 Y40 | | |
| 10[s] | : | : | |

| PARAMETER | |
|---|---|
| No.10 | 110 |
| No.20 | 120 |
| No.30 | 130 |
| : | : |

| PARAMETER | |
|---|---|
| No.10 | 210 |
| No.20 | 220 |
| No.30 | 230 |
| : | : |

| PARAMETER | |
|---|---|
| No.10 | 210 |
| No.20 | 220 |
| No.30 | 230 |
| : | : |

PROJECT A Ver1    PROJECT A Ver2

| MACHINING PROGRAM a | MACHINING PROGRAM |
|---|---|
| N2 X20 Y0 | N2 X30 Y0 |
| N3 X20 Y30 | N3 X30 Y30 |
| : | : |

PROJECT A Ver2    PROJECT A Ver3

| PARAMETER a | | PARAMETER | |
|---|---|---|---|
| No.100 | 110 | No.100 | 210 |
| No.200 | 120 | No.200 | 220 |
| : | : | : | : |

PROJECT A Ver3    PROJECT A Ver4

| WORKPIECE COORDINATE SYSTEM | | WORKPIECE COORDINATE SYSTEM | |
|---|---|---|---|
| X | 5 | X | 0 |
| Z | −20 | Z | −10 |
| : | : | : | : |

NUMERICAL CONTROLLER FOR MANAGING MACHINING DATA AND MACHINING RESULT

RELATED APPLICATION DATA

This application claims priority under 35 U.S.C. § 119 and/or § 365 to Japanese Application No. 2015-106777 filed May 26, 2015, the entire contents is incorporated herein by reference.

BACKGROUND OF THE INVENTION

Field of the Invention

The present invention relates to a numerical controller, and more particularly, to a numerical controller for managing machining data, such as machining programs and machining conditions, and results of machining.

Description of the Related Art

There is a technique (e.g., Japanese Patent Application Laid-Open No. 2007-226446) in which a plurality of machine tools of the same type are used for mass production. According to this technique, combinations of machining programs and machining conditions (including parameters, workpiece coordinate systems, etc.) in numerical controllers for the machine tools having performed prototype machining are collectively managed, as shown in FIG. 7, whereby reflection on the other machine tools is facilitated.

Data including machining programs and machining conditions lumped in this manner are generally called "projects", and a new project is stored in the numerical controller every time machining is performed. Normally, in prototype machining, fine adjustment of the machining programs and conditions is repeated many times so that machining accuracy and time desired by an operator are achieved. Therefore, a plurality of projects are stored in the numerical controller.

In a prototype machining operation, operators repeat the fine adjustment by trial and error to find out appropriate combinations of machining programs and machining conditions of projects. In order to efficiently perform this fine adjustment, the operators must guess where and how to adjust the machining programs and conditions to achieve a desired result.

Although skilled operators can finish the adjustment relatively quickly by making the guess based on their experience, however, unskilled operators must frequently repeat trial and error to ascertain the influence of the content of the adjustment on the machining accuracy and time, thus resulting in the problem of low efficiency. The technique disclosed in Japanese Patent Application Laid-Open No. 2007-226446 described above has a problem that information for supporting these operators' operations is not managed, so that it is difficult to understand how the machining accuracy and time are influenced by those projects which are finely adjusted in prototype machining.

SUMMARY OF THE INVENTION

Accordingly, the object of the present invention is to provide a numerical controller configured to facilitate an operator to ascertain the influence of fine adjustment of machining programs and machining conditions on projects.

A first aspect of a numerical controller according to the present invention is configured to control a machine based on input data including a machining program and a machining condition. The numerical controller includes: an operation execution unit configured to perform operation control of the machine based on the machining program and the machining condition and generate output data indicative of the result of the operation control; a data storage unit configured to store project data comprising the input data and the output data associated with each other and version information including a difference between versions of the project data; a data management unit configured to perform version management of the project data; and a display device configured to display the project data. The data management unit is configured to generate, when an operator selects the version of the project data, input data and output data corresponding to the version of project data selected by the operator, based on the project data and the version information stored in the data storage unit, and to store, when the operator modifies the input data and performs operation control based on the modified input data, a difference between the unmodified input data and the modified input data and a difference between the output data and output data indicative of the result of the operation control based on the modified input data, as new version information of the project data assumed to be a management object, in the data storage unit. And the display device is configured to display, with respect to a plurality of versions of the project data selected by the operator, the relationship between the content of modification of the input data between the plurality of versions and a change of the output data.

A second aspect of a numerical controller according to the present invention is configured to control a machine based on input data including a machining program and a machining condition. The numerical controller includes: an operation execution unit configured to perform operation control of the machine based on the machining program and the machining condition and generate output data indicative of the result of the operation control; a data storage unit configured to store project data comprising the input data and the output data associated with each other; a data management unit configured to perform version management of the project data; and a display device configured to display the project data. The data management unit is configured to store, when an operator selects project data to modify an input data included in the project data and performs operation control based on the modified input data, the modified input data and output data associated with the modified input data and indicative of the result of the operation control based on the modified input data, as a new version of the project data assumed to be an object of management, in the data storage unit. And the display device is configured to display, with respect to a plurality of versions of the project data selected by the operator, the relationship between the content of modification of the input data between the plurality of versions and a change of the output data.

The output data may include a processing time for each block of the machining program or coordinate values of each axis of the machine.

The display device may be configured to display the relationship between the content of modification of the machining program or the content of modification of the machining condition, which is included in the plurality of versions of the project data, and a change in the processing time for each block of the machining program.

The display device may be configured to display the relationship between the content of modification of the machining program or the content of modification of the machining condition, which is included in the plurality of versions of the project data, and the coordinate values of each axis By the numerical controller according to the present invention, it can easily be ascertained where and how the result of machining is influenced by input data.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

According to the present invention, projects are managed so that influenced parts of processing times and coordinate values for individual blocks can be located by adjusting machining programs and machining conditions (including parameters, workpiece coordinate systems, etc.).

For this management, in a numerical controller according to the present invention, input data used for machining operation and also output data obtained when an operation control based on the input data is performed are adopted, as data for managing the projects.

Figure 1:
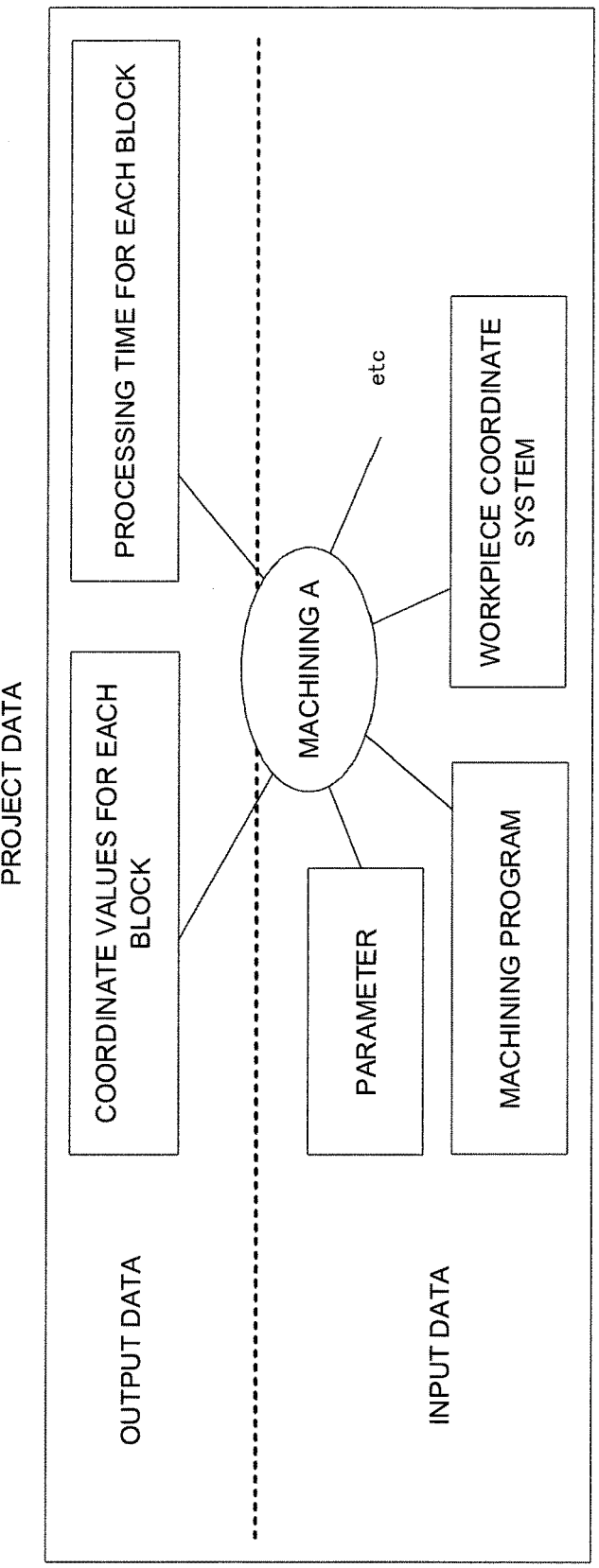
FIG. 1 shows an outline of data on a project managed by a numerical controller according to the present invention.

An outline of data on a project managed by the numerical controller according to the present invention will first be described with reference to FIG. 1.

In the present invention, the machining programs and the machining conditions, including the parameters, workpiece coordinate systems, etc., (hereinafter collectively referred to as "input data") and the processing times for the individual blocks of the machining programs in the case where a machining operation is performed based on the input data and the coordinate values in the workpiece coordinate systems of a machine tool as a control object (hereinafter collectively referred to as "output data") are managed as one project data.

Figure 2:
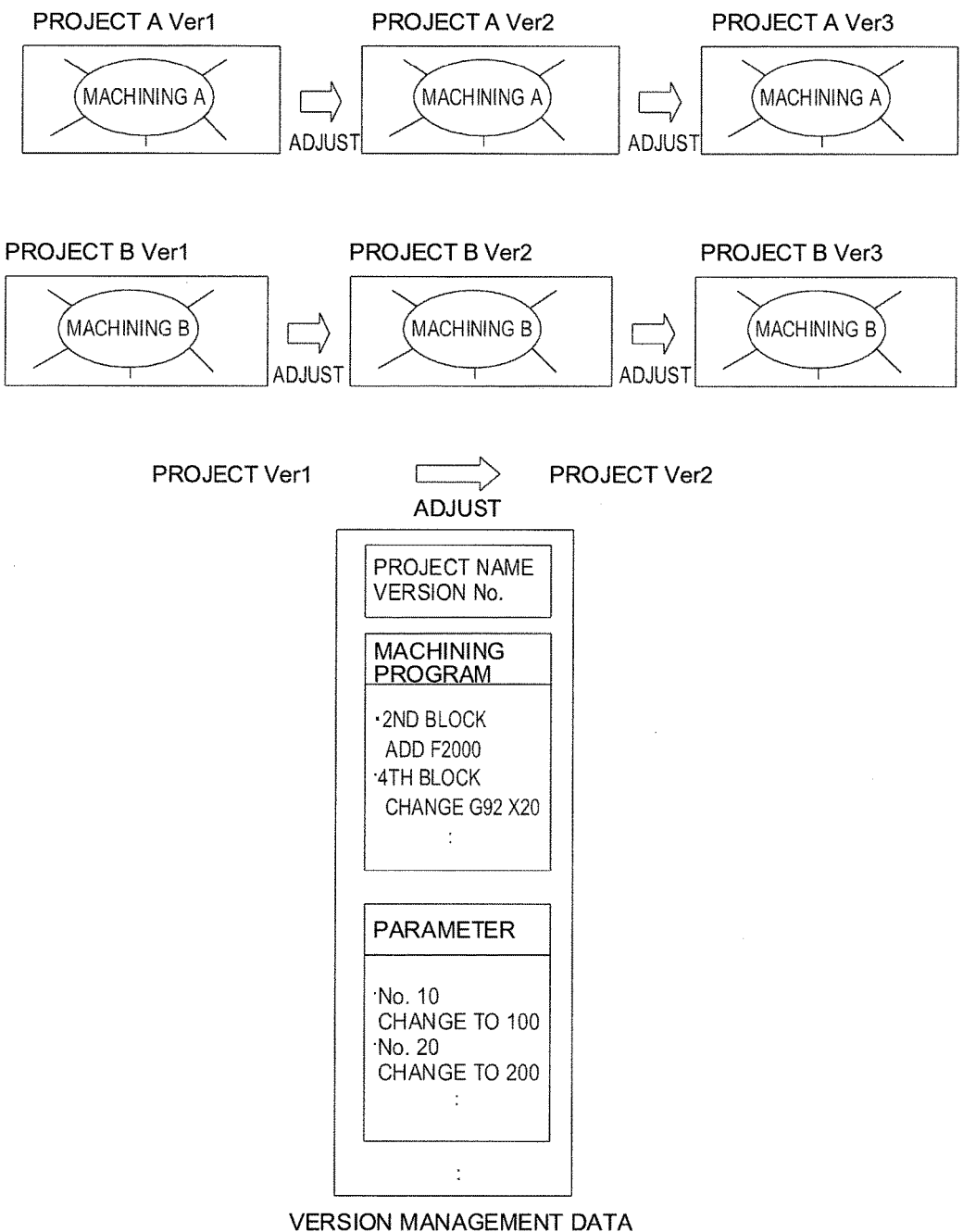
FIG. 2 is a diagram illustrating versions of the project data shown in FIG. 1.

Every time the input data, including the machining programs and conditions, are modified and the machining programs are executed, the projects are version-upgraded to generate differences between the data and the generated differences are managed as version management information, as shown in FIG. 2.

For a machining program, a change, addition, and deletion for each block of the machining program of a previous version are stored as data differences. For a machining condition, moreover, a value of a part that is changed from a machining condition value of the previous version is stored as a difference. For output data indicative of the result of operation control performed based on modified input data, furthermore, values of deviation from the processing time and the coordinate values for each block of the output data of the previous version are stored as differences, whereby the difference from the project of the previous version can be managed.

The correspondence relation between the difference of input data and the difference of output data, between the versions of the projects, is displayed on a display device, showing an operator how an adjustment of which of the input data influences the output data.

Figure 3:
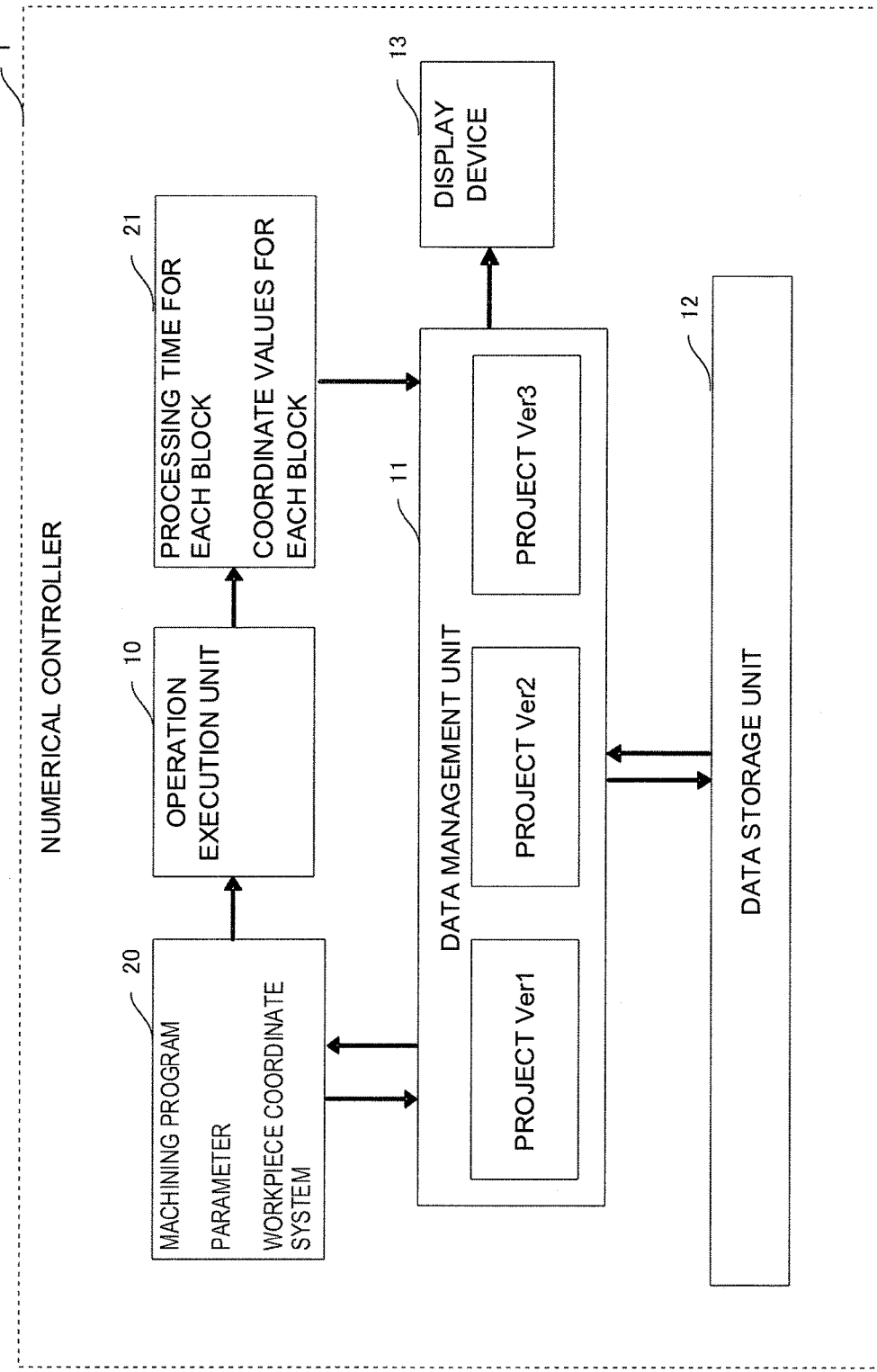
FIG. 3 is a block diagram showing functions of a numerical controller according to one embodiment of the present invention.

Functions of a numerical controller according to one embodiment of the present invention will be described with reference to FIG. 3.

A numerical controller 1 comprises an operation execution unit 10, data management unit 11, data storage unit 12, and display device 13.

The operation execution unit 10 performs a machining operation based on machining programs and machining conditions (including various parameters, workpiece coordinate systems, etc.). In performing the machining operation, the operation execution unit 10 measures the processing time for each block by means of a timer unit (not shown) and records coordinate values in the workpiece coordinate systems for the axes of a machine tool as a control object onto a memory for each block of a machining program to be executed. The stored processing time and coordinate values for each block are output to the data management unit 11.

The data management unit 11 performs version management of a project. The data management unit 11 has a check-out function, check-in function, and inter-version comparison display function, which are version management functions.

According to the check-out function of the data management unit 11, when data on a predetermined version of a predetermined project is requested by an operator, project data on a specified project and all version management data covering specified version for the project data are read from the data storage unit 12. Then the read version management data is sequentially applied to the read project data, and project data (input and output data) of the version specified by the operator is generated and output (or checked out). The check-out of the specified version of the specified project data is stored in the data management unit 11.

Figure 4A:
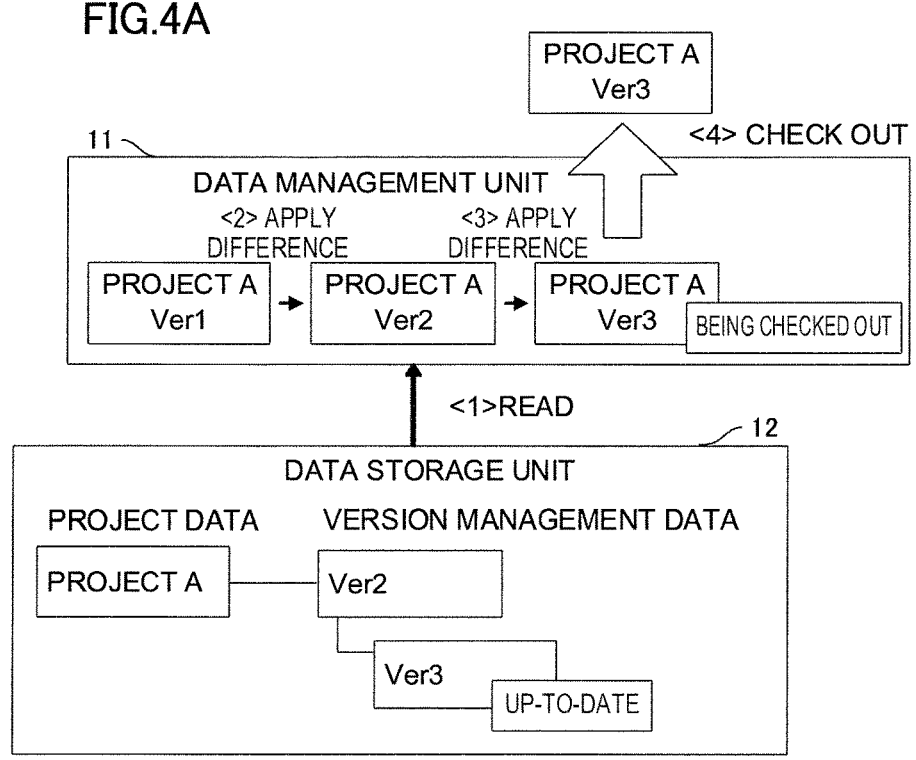
FIG. 4A is a diagram illustrating project data check-out processing performed by the numerical controller (data management unit) of FIG. 3 when project data of Version 3 of Project A is requested by an operator.

FIG. 4A is a diagram illustrating check-out processing of project data by the data management unit 11, which is performed when project data of Version 3 of Project A is requested by an operator.

In response to the operator's request for the project data, the data management unit 11 reads project data of Project A (equivalent to Version 1) stored in the data storage unit 12 and version management data of individual versions of Project A (version management data of Versions 2 and 3 in the example shown in FIG. 4A).

When reading of the version management data is completed, the data management unit 11 applies, to the input and output data included in the read project data, information on the differences included in the version management data of Version 2 to generate project data of Version 2 of Project A.

Then, information on the differences included in the version management data of Version 3 is applied to the project data of Version 2 of Project A to generate project data of Version 3 of Project A. The project data of Version 3 of Project A is output (or checked out) as a response to the request for the project data of Version 3 of Project A, and the check-out of the project data of Version 3 of Project A is temporarily stored.

According to the check-in function of the data management unit 11, when input data included in project data acquired by an operator through the data management unit 11 is modified and an operation control of a machine is carried out based on the modified input data, the modified input data and the output data obtained as a result of the operation control are received to generate new version management data, and the generated version management data is stored in the data storage unit 12 as a version management object.

Figure 4B:
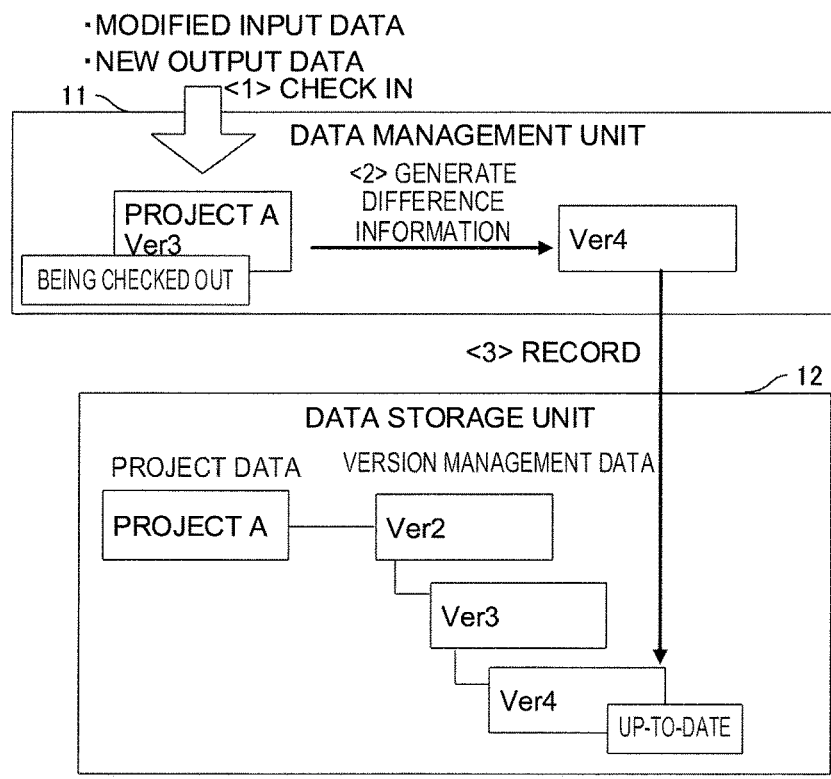
FIG. 4B is a diagram illustrating check-in processing performed when input data is modified by the operator, based on the project data of Version 3 of Project A, after the processing described with reference to FIG. 4A, and operation control of a machine is performed based on the modified input data.

FIG. 4B is a diagram illustrating check-in processing performed when input data is modified by an operator, based on the project data of Version 3 of Project A, after the processing described with reference to FIG. 4A, and the operation control of a machine is carried out based on the modified input data.

On receiving the input data modified based on the operator's control and new output dada, the data management unit 11 generates difference information between the input and output data included in the project data of Version 3 of Project A being checked out and the modified input data and the new output data, and generates version management data of a new version (Version 4) based on the generated difference information. Then, the data management unit 11 stores the generated version management data of Version 4 of Project A in the data storage unit 12, as a new management object, in association with the project data and the version management data of Project A.

According to the inter-version comparison display function of the data management unit 11, when an operator requests data on a predetermined version of a predetermined project, the project data on the specified project and all the version management data covering the specified version for the project data are read from the data storage unit 12. Then the read version management data is sequentially applied to the read project data, and project data to generate project data of the individual versions, thereby displaying the project data of the individual versions for comparison.

Figures 5, 7:
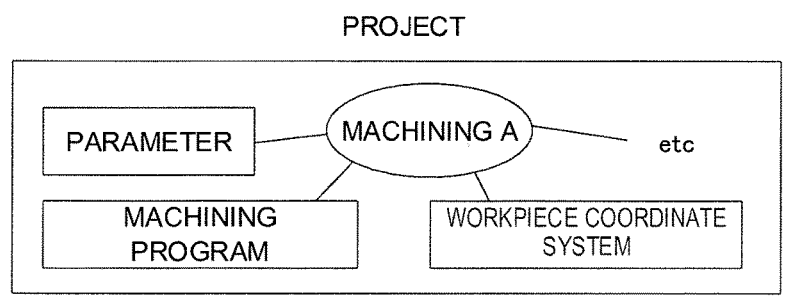
FIG. 5 is a diagram showing an example in which the relationships between machining programs (input data) of individual versions of projects and processing times (output data) for individual blocks are displayed by an inter-version comparison display function of the numerical controller (data management unit) of FIG. 3.
FIG. 7 is a diagram illustrating a prior art technique in which combinations of machining programs and machining conditions (including parameters, workpiece coordinate systems, etc.) in numerical controllers for controlling a plurality of machine tools of the same type for mass production are collectively managed.

FIG. 5 is a diagram showing illustrating an example in which the relationships between the machining programs (input data) of the individual versions of the projects and the processing times (output data) for the individual blocks are displayed by the inter-version comparison display function of the data management unit 11.

When an operator selects a project (and its up-to-date version) and instructs displaying of the relationships between the machining programs and the processing times for the respective blocks, the data management unit 11 reads project data on the project selected by the operator and version management data from the data storage unit 12, generates the project data of the individual versions, and displays the machining programs included in the generated project data of the individual versions side by side. In the example of FIG. 5, the ordinate represents the start time of each block, which is calculated so that the blocks can be displayed along the axis of ordinate. In the machining programs between the versions, corresponding blocks (unchanged blocks and partially modified blocks) are connected to each other by connecting lines so that which is shorter, in the times required for completion of processing of the block concerned, can be recognized at a glance.

Further, though not shown in FIG. 5, reductions or increases of the processing times for the blocks can easily be ascertained at a glance by changing the display attributes in such a manner that blue connecting lines are displayed for those blocks for which the processing time is reduced as the version is upgraded whereas red connecting lines are displayed for those blocks for which the processing time is increased, for example. For those blocks which are changed as the version is upgraded, moreover, ascertainment of changed portions is facilitated by highlighting, such as bold-facing or coloring.

In order to show a possibility that processing times for respective blocks have changed as a consequence other than machining programs, furthermore, parameters of the respective versions of the selected project are also displayed side by side. Even only one changed portion in the parameters between the versions may be extracted and displayed so that the changed portion can be highlighted, for example, bold-faced or colored for display.

In the display example shown in FIG. 5, although the machining programs of Versions 1 and 2 of Project A are not changed, parameters are changed, so that it can be ascertained at a glance that the processing time for each block is influenced by the change of the parameters.

Further, the machining programs of Versions 2 and 3 of Project A include a changed block (N50), while the parameters are not changed. Thus, it can be seen that the processing times for the blocks are changed due to the change of machining programs, without any influence of the parameters.

Figure 6A:
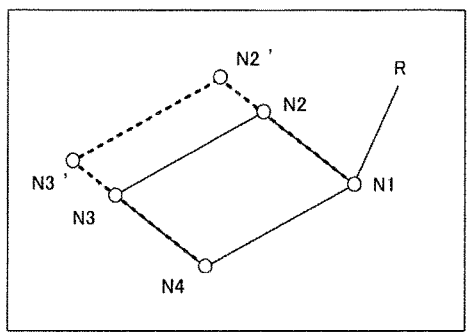
FIGS. 6A, 6B and 6C are diagrams showing examples in which the relationships between input data between the individual versions of the projects and coordinate values (output data) for each block are displayed by the inter-version comparison display function of the numerical controller (data management unit) of FIG. 3.
Figure 6B:
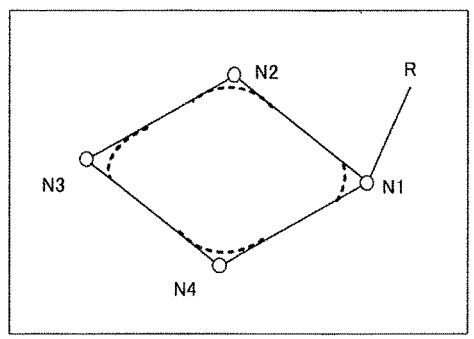
Figure 6C:
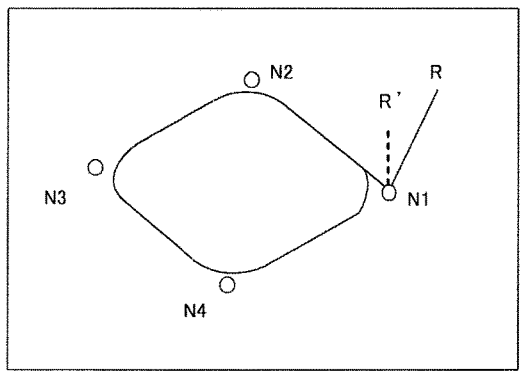

FIGS. 6A, 6B and 6C are diagrams showing examples in which the relationships between input data between the individual versions of the projects and coordinate values (output data) for each block are displayed by the inter-version comparison display function of the data management unit 11.

When the data management unit 11 generates the project data of each of the versions, the data management unit 11 connects, for two versions as comparison objects specified by an operator, the coordinate values for the individual blocks by lines and displays them, as in the example shown in FIG. 5, based on the coordinate values included in the project data. The coordinate values of the respective versions of two projects which are to be compared with each other are displayed superimposed.

For the coordinate values for each block, a line is drawn from a previous coordinate value to the next one. More specifically, for blocks which are not changed in the machining programs between the versions (or blocks which are not changed in the coordinate values), normal lines are drawn.

But, for blocks which are changed in the machining programs (or blocks which are changed in the coordinate values), highlighted lines, such as dotted-lines or colored lines, are displayed.

Also, input data of two versions to be compared with each other are displayed. FIG. 6A is an example of display of machining programs. In this case, changed blocks are extracted and displayed, and changed portions are highlighted, for example, bold-faced or colored for display.

In order to show a possibility that coordinate values for each block have been changed as a consequence other than machining programs, moreover, display of machining programs may be made switchable to display of parameters (FIG. 6B) of individual versions of the selected project or workpiece coordinate systems (FIG. 6C), based on an operator's operation or the like. Changed portions in the parameters or workpiece coordinate systems between the versions are extracted and displayed so that they can be highlighted, for example, bold-faced or colored for display.

In the example of FIG. 6A, although the machining programs of Version 2 of Project A include blocks that have been changed from Version 1, the parameters and the workpiece coordinate systems have never been changed. Thus, it can be seen that the coordinate values for each block have been changed by the change of the machining programs.

In the example of FIG. 6B, although the parameters of Version 3 of Project A include blocks that have been changed from Version 2, the machining programs and the workpiece coordinate systems have never been changed. Thus, it can be seen that the coordinate values for each block have been changed by the change of the parameters.

In the example of FIG. 6C, moreover, although the workpiece coordinate systems of Version 4 of Project A include blocks that have been changed from Version 3, the machining programs and the parameters have never been changed. Thus, it can be seen that the coordinate values for each block have been changed by the change of the workpiece coordinate systems While an embodiment of the present invention has been described herein, the invention is not limited to the above-described embodiment and may be suitably modified and embodied in various forms.

For example, functions (version management method, check-in function, check-out function, difference generating function, etc.) related to the version management that is performed by the data management unit 11 are not limited to those described above, and functions of a conventional version management system can be used as required.

In the embodiment described herein, moreover, the data structure stored in the data storage unit 12 comprises the project data of Version 1 and the individual version management data including the difference information of Version 2 and its subsequent versions. Alternatively, however, the project data of the individual versions may be stored directly. If this is done, although the amount of data increases, it is unnecessary to generate the project data using the difference information included in the version management information, so that the load of the whole processing can be reduced.

The invention claimed is:

1. A numerical controller configured to control a machine based on input data including a machining program and a machining condition, the numerical controller comprising:
an operation execution unit configured to perform operation control of the machine based on the machining program and the machining condition and generate output data indicative of a result of the operation control;
a data storage unit configured to store project data comprising the input data and the output data associated with each other and version information including a difference between versions of the project data;
a data management unit configured to perform version management of the project data; and
a display device configured to display the project data,
wherein the data management unit is configured
to generate, when an operator selects a version of the project data, input data and output data corresponding to the version of project data selected by the operator, based on the project data and the version information of the project data stored in the data storage unit, and
to store, when the operator modifies the input data and performs operation control based on the modified input data, (i) a difference between the input data and the modified input data and (ii) a difference between the output data and output data indicative of a result of the operation control based on the modified input data, as new version information of the project data in the data storage unit,
the display device is configured to display, with respect to a plurality of versions of the project data selected by the operator, relationship data between the plurality of versions of the project data, the relationship data including one or more of (i) an indication of a change in the machining program between the versions of the project data, (ii) an indication of a change in the machining condition between the versions of the project data, and (iii) an indication of a change in a processing time of a block of the machining program between the versions of the project data, and
the machining condition is (i) a parameter associated with performing operation control of the machine based on the machining program or (ii) a coordinate value of an axis of the machine.

2. The numerical controller according to claim 1, wherein the output data includes a processing time for each block of the machining program or coordinate values of each axis of the machine.

3. The numerical controller according to claim 1, wherein the relationship data includes an indication of a change in coordinate values of each axis of the machine between the versions of the project data.

4. A numerical controller configured to control a machine based on input data including a machining program and a machining condition, the numerical controller comprising:
an operation execution unit configured to perform operation control of the machine based on the machining program and the machining condition and generate output data indicative of a result of the operation control;
a data storage unit configured to store project data comprising the input data and the output data associated with each other;
a data management unit configured to perform version management of the project data; and
a display device configured to display the project data,
wherein the data management unit is configured to store, when an operator selects project data to modify an input data included in the project data and performs operation control based on the modified input data, the modified input data and output data associated with the modified input data and indicative of a result of the operation control based on the modified input data, as a new version of the project data, in the data storage unit, the display device is configured to display, with respect to a plurality of versions of the project data selected by the operator, relationship data between the plurality of versions of the project data, the relationship data including one or more of (i) an indication of a change in the machining program between the versions of the project data, (ii) an indication of a change in the machining condition between the versions of the project data, and (iii) an indication of a change in a processing time of a block of the machining program between the versions of the project data, and the machining condition is (i) a parameter associated with performing operation control of the machine based on the machining program or (ii) a coordinate value of an axis of the machine.

5. The numerical controller according to claim 4, wherein the output data includes a processing time for each block of the machining program or coordinate values of each axis of the machine.

6. The numerical controller according to claim 4, wherein the relationship data includes an indication of a change in coordinate values of each axis of the machine between the versions of the project data.

\* \* \* \* \*